Nov. 10, 1925.
W. G. UNGER
1,561,379
PISTON AND PISTON RING
Filed Aug. 9, 1924
2 Sheets-Sheet 1

Inventor
Wilfred G. Unger
his Attorney

Patented Nov. 10, 1925.

1,561,379

UNITED STATES PATENT OFFICE.

WILFRED G. UNGER, OF HAGERSTOWN, MARYLAND.

PISTON AND PISTON RING.

Application filed August 9, 1924. Serial No. 731,220.

*To all whom it may concern:*

Be it known that I, WILFRED G. UNGER, a citizen of the United States, residing at Hagerstown, in the county of Washington and State of Maryland, have invented certain new and useful Improvements in Pistons and Piston Rings; and I do hereby declare the following to be a full, clear, and exact description of the invention, such as will enable others skilled in the art to which it appertains to make and use the same.

The invention relates to a piston and piston ring structure particularly adapted for use in gas engines.

The primary object of the invention, generally stated, is to provide a piston and ring structure which will overcome slapping of the piston within its cylinder and prevent compression leakage and oil pumping, in addition to compensating for more or less misalinement.

It is well known that great care must be exercised in fitting and installing pistons in internal combustion engines, especially the high powered and high speed type used in motor vehicles. As the temperature in such motors constantly changes according to the speed and load, the piston is continually expanding or contracting as the case may be and heretofore it has been difficult to fit the piston so as to allow a wide range of expansion and contraction while avoiding such looseness as to cause slapping.

It is another commonly known fact that there is generally, if not always, more or less leakage of compression and oil, and even carbon, past the rings on account of wearing of the cylinders out-of-round by reason of misalinement or simply as a result of prolonged use. When ordinary split rings are used, a direct path for leakage is provided when it occurs that the rings shift into such positions that the splits therein are in alinement. Another source of trouble is the wearing of the rings within the grooves and the wearing of the grooves themselves which results in permitting oil to work in between and past the rings and the points or areas of the piston engaged thereby. Such oil leakage also results in loss of compression and a substantial loss of power. It is also true in the ordinary piston construction and in assembling the same that the sides of the piston must be exactly at right angles to the axis of the wrist pin with which the connecting rod is engaged and it has been found that after use a piston has generally become "cocked" or out of alinement as a result of the pressure to which it is subjected while in service, such misalinement obviously causing undue wear on certain portions of the cylinder walls which eventually results in slapping.

It is with the above facts in view that I have designed the present invention which has for a more particular object the provision of a piston which may be comparatively loosely fitted within a cylinder and which is equipped with rings so arranged as to have a more or less balancing effect whereby the piston may be said to have somewhat of a floating fit while the rings with which it is equipped maintain firm and close contact with the walls for preventing leakage at this point, the ends of the piston being reduced with respect to the central portion to permit an automatic correction of any reasonable error in alinement.

The invention has for a still further object the provision of a piston and ring structure therefor in which the rings are arranged in pairs and held firmly against each other and against the walls of the grooves by an auxiliary contracting ring which exerts a constant lateral pressure upon the main rings for preventing movement of the latter within their grooves, the rings of each pair being moreover so held with respect to the piston by positive means provided for the purpose that circumferential displacement or creeping is prevented.

To the attainment of the foregoing and other objects and advantages, the invention consists in the details of construction and arrangement to be hereinafter more fully described and claimed and illustrated in the acccmpanying drawings, it being, however, understood that the embodiment disclosed is merely a preferred exemplification as many changes and modifications may be made, provided they constitute no departure from the spirit of the invention or the scope of the claims hereunto appended.

In the drawings wherein like reference characters designate corresponding parts throughout the several views.

Figure 1:
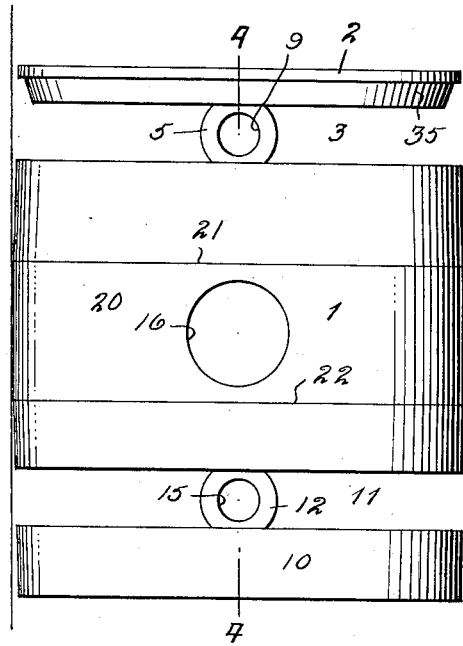
Figure 1 is a side elevation of a piston constructed in accordance with the invention, the rings being omitted.
Figure 2:
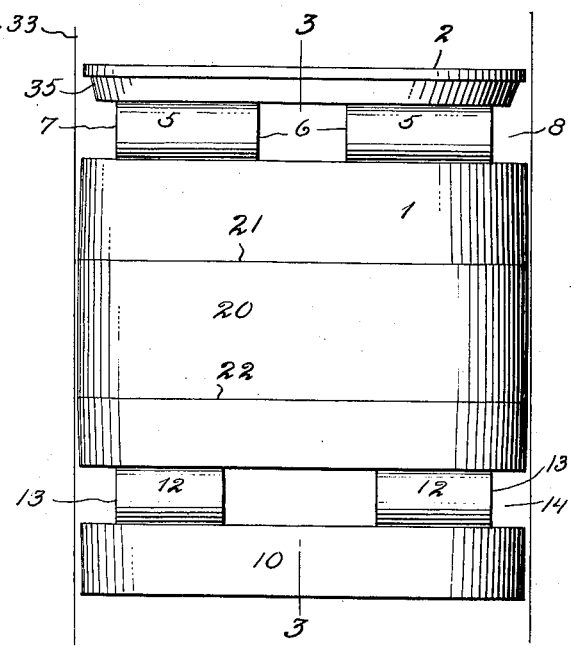
Figure 2 is an elevation at right angles to Figure 1, the rings being omitted.
Figure 3:
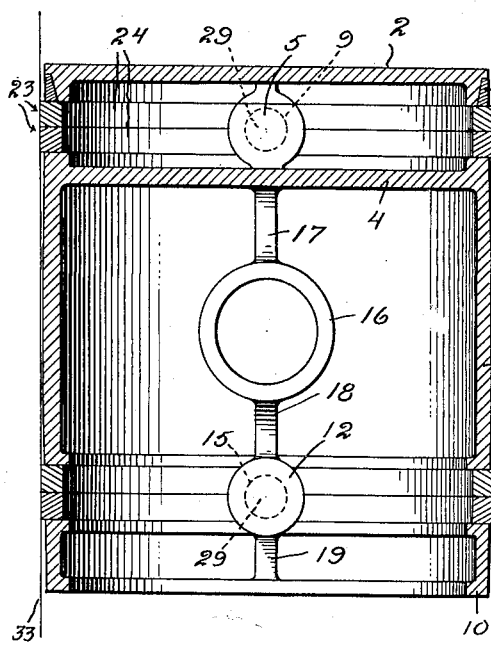
Figure 3 is a longitudinal section on the line 3—3 of Figure 2, the rings being in place.
Figure 4:
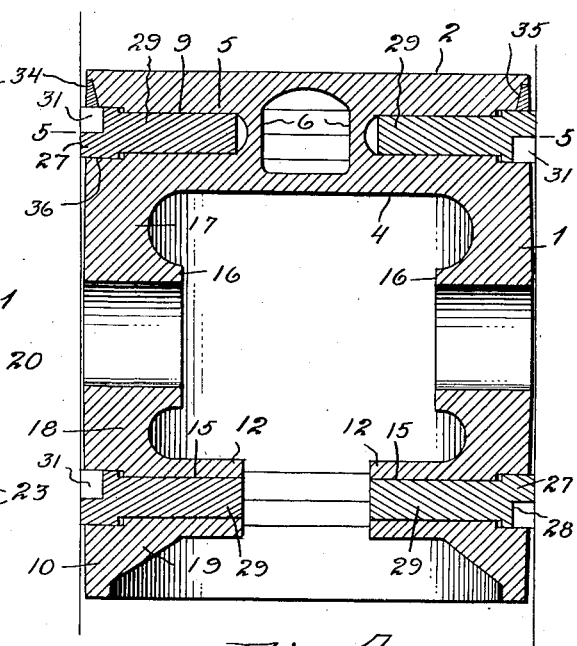
Figure 4 is a section at right angles to Figure 3 or on the line 4—4 of Figure 1 with the rings in place.
Figure 5:
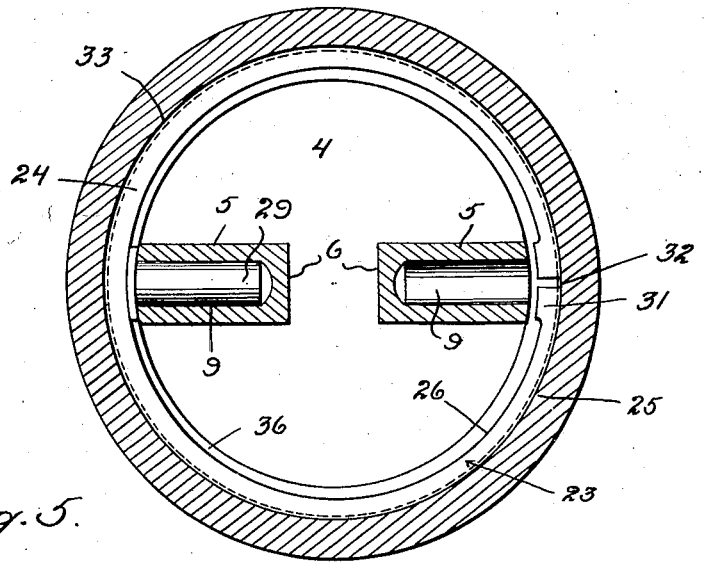
Figure 5 is a transverse section on substantially the line 5—5 of Figure 4 with one ring in place and the other removed.

Referring to the drawings in detail, the piston is shown as comprising a body 1 of hollow formation and having an end wall or head 2 separated from the main body by a space 3 serving as a groove. The top or end of the body adjacent the head 2 is closed by a wall 4 and supporting the head properly with respect to the body, I provide bosses 5 located between the head 2 and wall 4 and formed integrally therewith, and these bosses have their inner ends 6 terminating in spaced relation, as shown, while their outer ends 7 are spaced inwardly from the side wall of the body to provide spaces 8 for the accommodation of the rings to be described. These bosses are formed with radial openings 9 for a purpose to be described.

The end of the body opposite the head 2 is open and is formed with an extension portion 10 separated from the body to define a space 11 serving as a groove, the connection with the body consisting of bosses 12 similar to the bosses 5 and likewise having their outer ends 13 spaced inwardly from the side walls of the body to define spaces 14 for the accommodation of another set of rings. These bosses 12 are formed with openings 15 corresponding to the first described openings 9 and for an equivalent purpose.

At the sides of the body are bosses 16 providing bearings for the wrist pin, not shown, with which the usual connecting rod is connected, and these bosses are braced or reinforced with respect to the remainder of the body by webs 17 and 18, the former of which merge into the wall 4 and the latter of which merge into the bosses 12 which are in turn braced with respect to the body by webs 19.

While it is conceivable that the piston might be of uniform diameter throughout, it is preferable that the central portion 20, defined between the lines 21 and 22, be cylindrical, and that the body be gradually reduced in diameter toward both ends, as clearly indicated in Figures 1 to 4, inclusive, in order to provide for an automatic correction of any errors in alinement occurring as the result of faulty fitting or lack of trueness of the cylinder, either initially or as the result of wear, or such as might occur from any other cause.

In conjunction with the piston as above described, use is made of pairs of rings, indicated broadly at 23, one pair being located within the space or so-called groove 3 and the other pair being located within the space or so-called groove 11. The rings of each pair are identical and each includes a body 24 having a circular outer periphery 25 and an eccentric inner periphery 26. The flat sides of the rings are ground so that those of each pair will have a close fit with each other and with the seats against which they bear. At its widest portion, each ring is formed with a lug 27 having a height equal to the thickness of the ring and the outer end of each lug is cut away at 28 for the accommodation of the other ring of the pair. Each lug is additionally formed with a reduced extension 29 of a size to be received within the opening 9 or 15. The formation of the reduced extension 29 defines a bearing portion or surface 30 on the lug which will engage against the outer end of a boss 5 or 12, as the case may be, for properly centering the rings with respect to the piston body. It should be stated that the inner periphery 26 is not truly eccentric in that the ends 31 at the split 32, which split is located diametrically opposite the lug, are formed as wide as the widest portion of the ring and these widened ends 31 are accommodated within the above referred to cut-out portions 28, the splits 32 being consequently covered.

Figure 6:
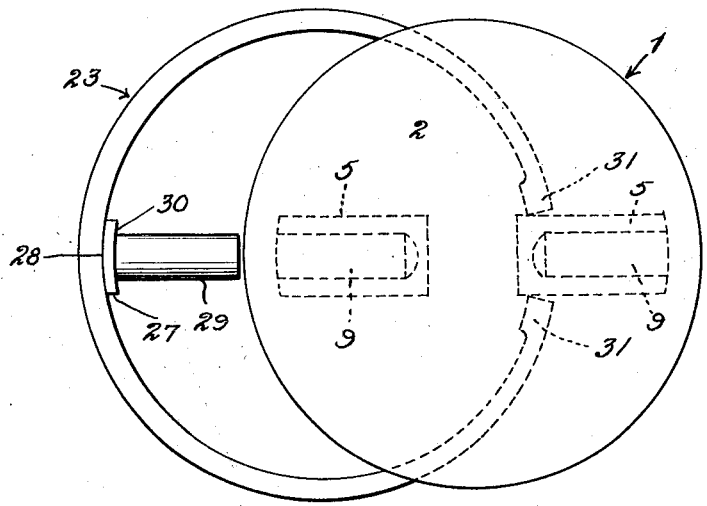
Figure 6 is an end elevation of the piston showing the manner of applying the rings thereto, only one ring being shown.
Figure 7:
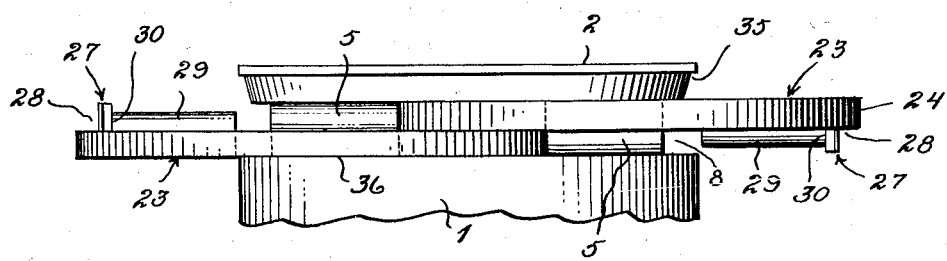
Figure 7 is a fragmentary side elevation of the piston showing the application of the rings, two rings being illustrated.

The rings of each pair are applied from opposite sides of the piston and by referring to Figure 6, it will be apparent that it is necessary to spread the rings only sufficiently to pass over the bosses 5 or 12, as the case may be, instead of spreading them sufficiently to pass over the end of the piston as is the practice in the ordinary construction. The rings of each pair are reversed with respect to each other, as indicated in Figure 7, so that they are overlapped during the operation of applying them, the reduced extensions 29 being received within the openings 9 and 15 of the bosses 5 or 12, as the case may be.

The above described rings are of the expanding type and their inherent resilience will cause them to bear closely against the cylinder wall, indicated at 33. In conjunction with the pair of rings located at the space or so-called groove 3, I make use of a contracting ring 34 fitting within a groove 35 in the periphery of the head 2 and bearing against the adjacent ring 23. The groove 35 has its bottom beveled or tapered and the inner periphery of the ring 34 is correspondingly beveled or tapered for conforming engagement therewith, and owing to the beveling of the contacting surfaces it is evident that the ring 34 tending to contract will tend also to move longitudinally of the piston and into close engagement with the flat face of the adjacent ring 23 and not only force it into close engagement with the other ring of the pair but hold both rings 23 tightly against the seat 36 at the space or groove 3.

In the use of a piston and ring structure such as shown and described, it will be seen that the pairs of rings above and below the wrist pin will have a somewhat balanced effect and will provide proper and close contact with the cylinder wall while at the same time the piston itself may have a comparatively loose fit within the cylinder so that the maximum expansion is permissible without danger of binding. The tapering off of the ends of the piston body will allow for errors in alinement and prevent scoring of the cylinder wall or other injury thereto even in the event that the piston should initially, or later, be slightly "cocked" with respect to the cylinder axis. The rings of each pair are incapable of circumferential creeping as they are positively held by the engagement of the lug extensions within the bosses and it is consequently impossible for the splits in the rings ever to become alined, as frequently occurs in the use of the ordinary type, so that leakage from this cause will be impossible. The contracting ring 34 is always spaced from the cylinder wall and as the upper end of the piston is of less diameter than the intermediate portion, compression within the engine may pass between the contracting ring 34 and the cylinder and come against the outermost ring 23. The pressure within the engine at the compression or explosion stroke will force this ring into tight engagement with the one next adjacent and the pressure of the ring 34 tending to slide within its beveled groove causes a close engagement with the ring 23 so that the points of contact will be tight and leakage of compression or oil through the groove in back of, or within, the rings positively prevented. As the rings 23 are incapable of movement longitudinally of the piston, there are no areas of wear other than at their outer peripheries and this is taken care of by the inherent expanding tendency. As the grooves cannot become worn the rings should fit tightly and prevent leakage and slapping for the life of the engine.

Having now described my invention, what I claim as new and desire to secure by Letters Patent, is:

1. In a piston and ring structure, a body having a cylindrical intermediate portion and tapered end portions, the end portions being formed to provide grooves, and rings seating within said grooves, the tapering of the end portions permitting automatic correction of misalinement.

2. In a piston and ring structure, a piston body having end portions spaced from and connected with the intermediate portion to define ring receiving grooves, bosses within the body at said grooves, and a pair of rings within each groove having means engaging said bosses for preventing circumferential creeping of the rings and piston slapping.

3. In a piston and ring structure, a piston body formed to provide a ring receiving groove and provided internally with bosses opposite the groove, the bosses being formed with openings, and a pair of rings located within the groove and formed with lugs engaging within said openings.

4. In a piston and ring structure, a piston body formed to provide a ring receiving groove and provided interiorly with oppositely arranged bosses, and a pair of rings located within the groove in opposed relation and having lugs received within the bosses.

5. In a piston and ring structure, a piston body including a head portion spaced from the main body and formed with bosses constituting the connection between the head portion and body, the spacing of the head portion from the body defining a ring receiving groove, and a pair of rings located within the groove in opposed relation and formed with projections engaging the bosses.

6. In a piston and ring structure, a piston body having a head portion spaced therefrom and formed with bosses spaced inwardly from the outer periphery and constituting the connection between the body and the head portion, and a plurality of similar rings located between the body and head portion outwardly of the bosses and formed with projections engaged within the bosses.

7. In a piston and ring structure, a piston body including a head portion spaced therefrom to define a groove, bosses within the body connecting the head portion therewith, the bosses being formed with openings and having their outer ends terminating short of the periphery of the body, rings located within the groove and having lugs received within the bosses, said head portion having a groove leading into said first named groove, the bottom of the second named groove being beveled, and a contracting ring located within said second named groove and having a beveled inner periphery engaging the beveled bottom of the second named groove whereby the contracting ring will tend to move longitudinally of the body and firmly engage the adjacent first named ring.

8. In a piston and ring structure, a piston body including a head portion spaced therefrom to define a groove, bosses within the body connecting the head portion therewith, the bosses being formed with openings and having their outer ends terminating short of the periphery of the body, similar rings located within the groove and having lugs received within the bosses, said head portion having a groove leading into said first named groove, the bottom of the second named groove being beveled, and a contracting ring located within said second named groove and having a beveled inner periphery engaging the beveled bottom of the second named groove whereby the contracting ring will tend to move longitudinally of the body and firmly engage the adjacent first named ring, the first named rings being split at points diametrically opposite the lugs, and each ring sealing the split in the other.

9. In a piston and ring structure, a piston body having a ring receiving groove and having openings at the groove, a pair of rings arranged in opposite relation and fitting within said groove, the rings being formed with means engaging within said openings, the body having a groove with a beveled bottom leading into said first named groove, and a contracting ring with a beveled inner periphery fitting within the second named groove and tending normally to compressingly engage against the flat face of one of the adjacent first named rings for holding the first named rings together and to their seat.

10. In a piston and ring structure, a piston having a tapered end portion formed with a groove, expansion rings mounted within said groove and adapted to engage a cylinder wall, the piston having a second groove leading into the first named groove and formed with a beveled bottom, and a contracting ring with a beveled inner periphery fitting within the second named groove and normally tending to move longitudinally of the piston into clamping engagement with the adjacent first named ring, said contracting ring being spaced from the cylinder wall whereby to permit engine pressure to be exerted against the face of the adjacent first named ring.

11. In a piston and ring structure, a piston body having a ring receiving groove therein and formed with bosses terminating short of the outer periphery, the bosses having openings oppositely disposed, rings located within the groove and formed with enlarged portions located at the outer ends of the bosses, the rings having lugs at said enlarged portions fitting within said openings, the rings being split at points opposite the lugs, and each ring sealing the split in the other.

In testimony whereof I affix my signature.

WILFRED G. UNGER.